United States Patent
Lin et al.

(10) Patent No.: US 8,907,905 B2
(45) Date of Patent: Dec. 9, 2014

(54) SENSING DEVICE, TOUCH SENSING SYSTEM, AND DISPLAY DEVICE

(75) Inventors: Song Sheng Lin, Hsinchu (TW); Ssu-Wei Chang, Hsinchu (TW); Ying-Jyh Yeh, Hsinchu (TW)

(73) Assignee: Silicon Intergrated Systems Corp., Hsinchu (TW)

( * ) Notice: Subject to any disclaimer, the term of this patent is extended or adjusted under 35 U.S.C. 154(b) by 457 days.

(21) Appl. No.: 13/329,076

(22) Filed: Dec. 16, 2011

(65) Prior Publication Data

US 2013/0154997 A1      Jun. 20, 2013

(51) Int. Cl.
*G06F 3/041*      (2006.01)

(52) U.S. Cl.
USPC .......................................... 345/173; 345/174

(58) Field of Classification Search
USPC .......... 345/156–184; 178/18.03, 18.05, 18.06
See application file for complete search history.

(56) References Cited

U.S. PATENT DOCUMENTS

| | | | | |
|---|---|---|---|---|
| 6,075,520 A * | 6/2000 | Inoue et al. | ..................... | 345/173 |
| 8,390,361 B2 * | 3/2013 | Ningrat | ......................... | 327/337 |
| 8,681,110 B2 * | 3/2014 | Huang et al. | .................. | 345/173 |
| 2005/0001633 A1 * | 1/2005 | Okushima et al. | ............ | 324/658 |
| 2010/0194692 A1 | 8/2010 | Orr et al. | | |
| 2011/0084926 A1 | 4/2011 | Chang et al. | | |
| 2011/0084927 A1 | 4/2011 | Chang et al. | | |
| 2011/0084930 A1 | 4/2011 | Chang et al. | | |
| 2011/0084937 A1 | 4/2011 | Chang et al. | | |
| 2011/0087455 A1 | 4/2011 | Chang et al. | | |
| 2011/0163994 A1 * | 7/2011 | Tang et al. | ..................... | 345/174 |
| 2011/0187390 A1 * | 8/2011 | Lin et al. | ....................... | 324/679 |
| 2011/0187663 A1 * | 8/2011 | Lin et al. | ....................... | 345/173 |
| 2011/0188619 A1 | 8/2011 | Sugioka | | |
| 2011/0193571 A1 * | 8/2011 | Lin et al. | ....................... | 324/679 |

* cited by examiner

*Primary Examiner* — Dmitriy Bolotin
(74) *Attorney, Agent, or Firm* — Morris Manning & Martin LLP; Tim Tingkang Xia, Esq.

(57) ABSTRACT

A sensing device placed in a touch sensing system of a display device includes a selector, a sensing module, and a detection module for determining touch signals generated by the touch sensing system. The selector selects two of the touch signals according to at least one selection control signal. The sensing module comprises a first differential amplifier for comparing the selected touch signals and producing a first differential signal according to first control signals. According to second control signals, the detection module receives the first differential signal, generates an averaged sensing value and a reference value, and compares the averaged sensing value with the reference value to produce a second differential signal. Thereby, the touch sensing system uses the second differential signal to generate the first control signals and the second control signals to control the operation of the touch sensing system.

19 Claims, 6 Drawing Sheets

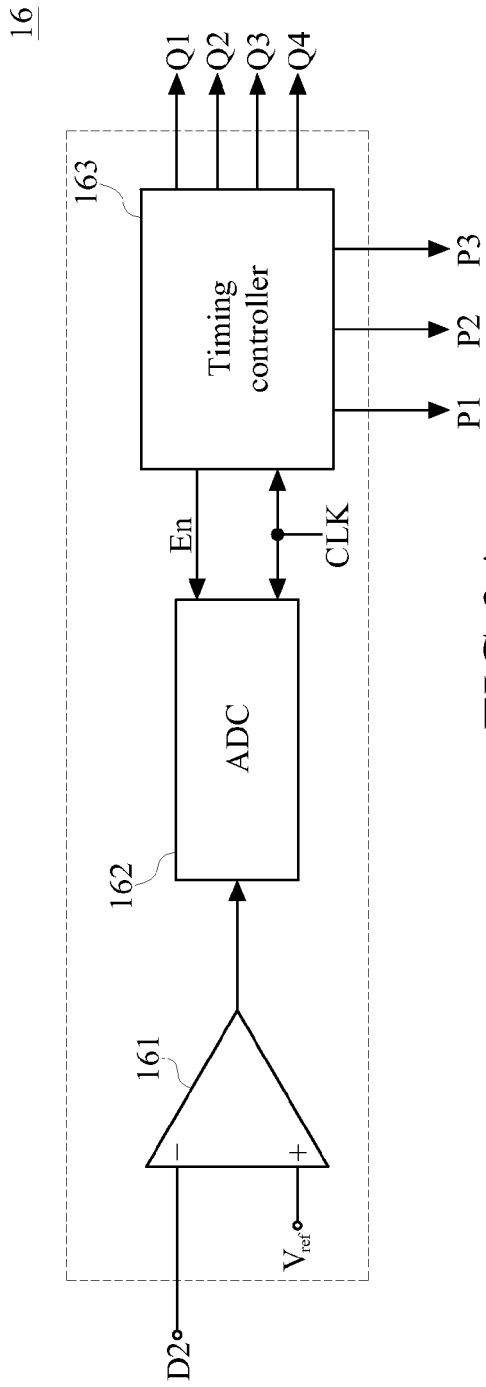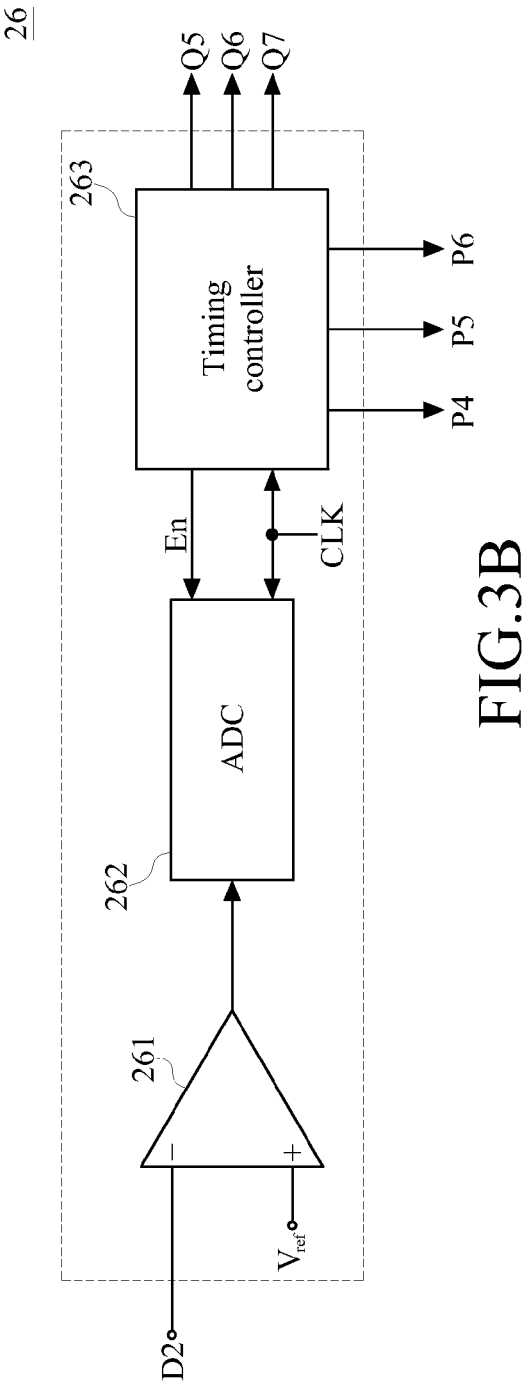

SENSING DEVICE, TOUCH SENSING SYSTEM, AND DISPLAY DEVICE

BACKGROUND

1. Technical Field

The disclosure relates to a display device, and more particularly to a sensing device for determining touch signals generated by a touch sensing system of the display device.

2. Related Art

With the development of technology, touch display devices have been widely used in various electronic devices. A touch display device usually includes a touch input interface, a sensing device, and an analog to digital converter (ADC). The touch input interface provides signal generation units to a user, and thereby the user can use an external object (e.g. a finger) to touch or slide on the surface of the touch display, and then the signal generation units generate touch signals and transmit the touch signals to the sensing device. The sensing device determines whether there is any touch happened to one of sensing lines thereof by comparing one of sensing lines and an adjacent sensing line thereof. Every sensing line corresponds to one of the signal generation unit.

The sensing device compares the two signals from the two sensing lines to generate a compared signal which can be converted into continuous signal values by an analog to digital converter (ADC). Moreover, by comparing signal values before and after the touch or approaching of the external object, the position touched or approached by the external object can be determined.

SUMMARY

The disclosure is a sensing device for determining N touch signals generated by a touch input interface of a touch sensing system, and N is a positive integer. The sensing device includes a selector, a sensing module, and a detection module. The selector selects an ith touch signal and a (i+1)th touch signal from N touch signals according to at least one selection control signal, i is a positive integer from 1 to (N−1). The sensing module connects to the selector in series and comprises a first differential amplifier for comparing the selected touch signals and producing a first differential signal according to first control signals. The detection module connects to the sensing module in series for according to second control signals, generating an averaged sensing value and a reference value from the first differential signal, and comparing the averaged sensing value with the reference value to produce a second differential signal.

The disclosure provides a touch sensing system which includes a touch input interface and the sensing device described as above. The touch input interface connects to the selector in series and comprises N sense capacitance circuits for providing the N touch signals to the selector.

Moreover, the disclosure provides a display device which includes the touch sensing system described as above.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The disclosure will become more fully understood from the detailed description given herein below for illustration only, and thus are not limitative of the disclosure, and wherein:

FIG. 3A is a circuit structure diagram of an embodiment of a control module of the implementation of FIG. 1;

FIG. 3B is a circuit structure diagram of another embodiment of a control module of the implementation of FIG. 1;

DETAILED DESCRIPTION

The detailed features and advantages of the disclosure are described below in great detail through the following embodiments, the content of which is sufficient for those of ordinary skill in the art to understand the technical content of the disclosure and to implement the disclosure accordingly. Based upon the content of the specification, the claims, and the drawings, those of ordinary skill in the art can easily understand the relevant objectives and advantages of the disclosure.

The disclosure provides a touch sensing system which can be implemented in a device or any system having a touch input interface so that the touch sensing system may generate touch signals through the touch input interface when a user touches the touch input interface.

Figure 1:
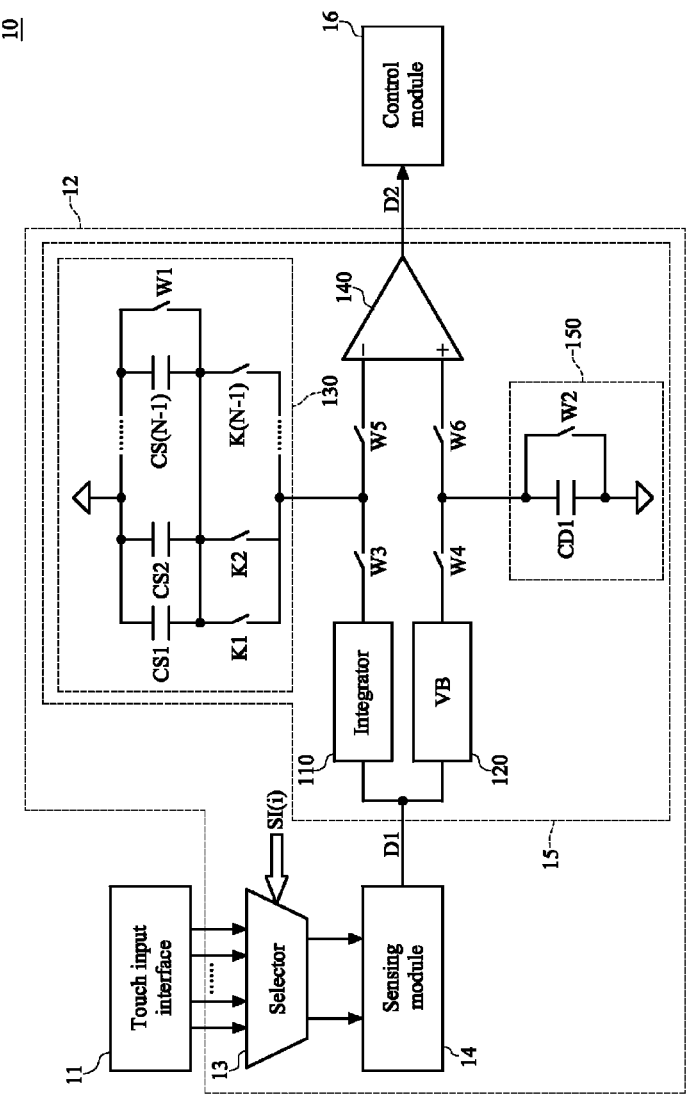
FIG. 1 is a block diagram of a device including a touch sensing system according to an embodiment of the disclosure.

FIG. 1 illustrates a block diagram of a touch sensing system to an embodiment of the disclosure. The touch sensing system 10 includes a touch input interface 11, a sensing device 12, and a control module 16. The touch input interface 11 may be a touch panel including N sensing capacitors resulted from N sensing lines (not shown in FIG. 1) which may generate N touch signals when a user touches the touch input interface 11. The touch signals generated by the touch input interface 11 are transmitted to the sensing device 12. N is a positive integer.

The sensing device 12 includes a selector 13, a sensing module 14, and a detection module 15. As shown in FIG. 1, the selector 13 may be a multiplexer, a logic circuit, or the like for selection. The sensing device 12 may select two of the touch signals from the touch input interface 11 from the selection control signals SI(i) and SI(i+1) to determine whether there is any touch happened to one of sensing lines thereof by comparing one of sensing lines and an adjacent sensing line thereof, wherein i is a positive integer from 1 to (N−1). Every sensing line includes a corresponding one of the sensing capacitors. Two of the sensing capacitors generating the selected touch signals are arranged to be adjacent to each other. The sensing module 14 connects to the selector 13 for receiving the selected two touch signals and comparing the two selected touch signals to generate a first differential signal D1. The detection module 15 connects to the sensing module 14 for receiving the first differential signal D1, and then generates an averaged sensing value and a reference value from the differential amplifier D1 and compares the averaged sensing value with the reference value to produce a differential signal D2. The control module 16 connects to the detection module 15 for receiving the differential signal D2, digitizing the differential signal D2 and generating control signals according to the differential signal D2. The detailed structures of the sensing module 14, the detection module 15, and the control module 16 are described as below.

Figure 2:
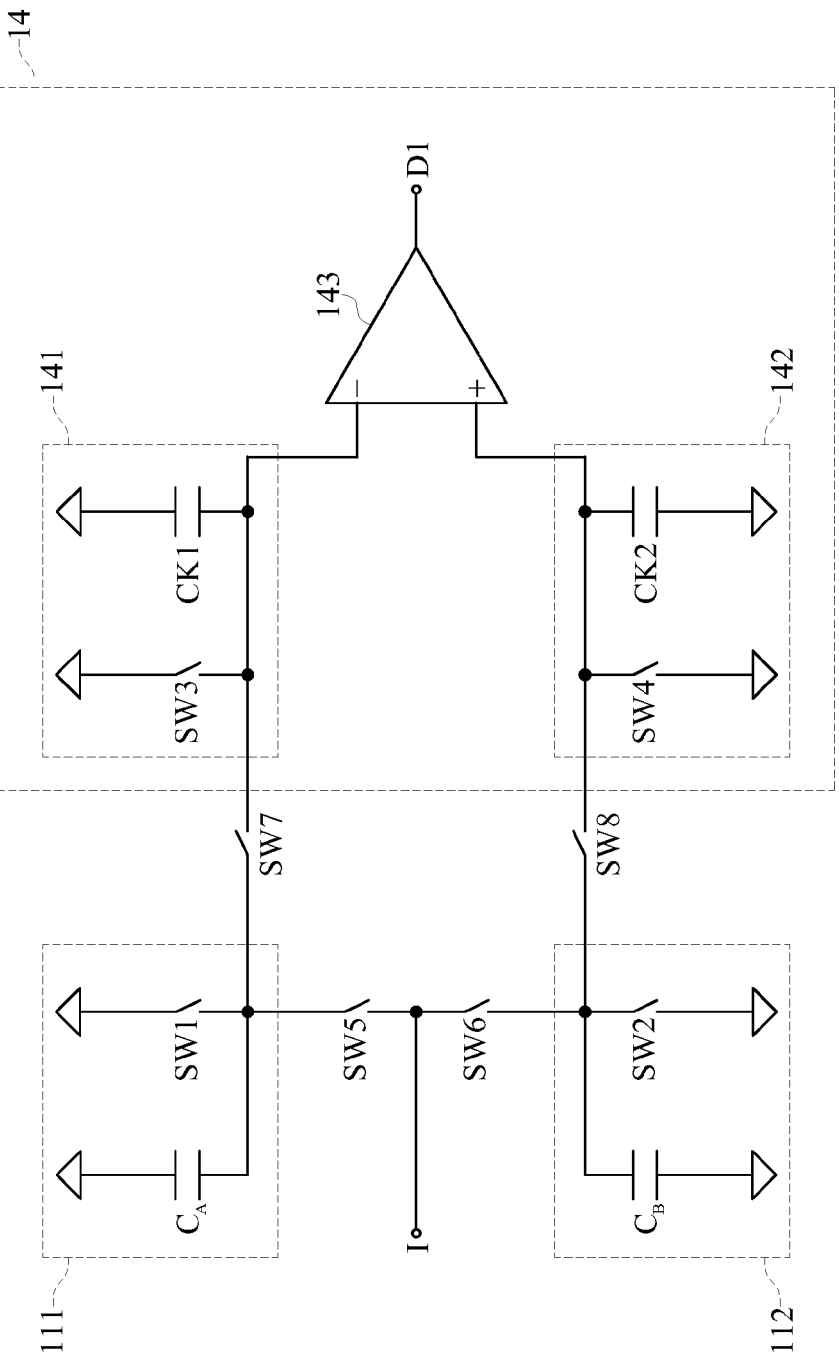
FIG. 2 is a circuit structure diagram of an embodiment of a sensing module of the implementation of FIG. 1.

FIG. 2 illustrates a circuit structure diagram of an embodiment of a sensing module 14 of the implementation of FIG. 1. The sensing module 14 includes charge maintenance circuits 141 and 142 and a differential amplifier 143. The charge maintenance circuit 141 connects to a sense capacitance circuit 111 through a switch SW7 and connects to the differential amplifier 143, and this forms a first sensing line. The charge maintenance circuit 142 connects to a sense capacitance circuit 112 through a switch SW8 and connects to the differential amplifier 143, and this forms a second sensing line. The sense capacitance circuit 111 includes a capacitor $C_A$ and a switch SW1 which connects to the capacitor $C_A$ in parallel. The sense capacitance circuit 112 includes a capacitor $C_B$ and a switch SW2 which connects to the capacitor $C_B$ in parallel. The capacitors $C_A$ and $C_B$ may be configured in the touch input interface 11 as shown in FIG. 1. The charge maintenance circuit 141 includes a capacitor CK1 and a switch SW3 which connects to the capacitor CK1 in parallel. The charge maintenance circuit 142 includes a capacitor CK2 and a switch SW4 which connects to the capacitor CK2 in parallel.

When the switch SW7 is closed and when the switch SW3 is opened, the capacitor CK1 of the charge maintenance circuit 141 receives one of the selected touch signals from the sense capacitance circuit 111 and is charged so as to maintain the touch signal. The charged voltage between the two ends of the capacitor CK1 becomes the input of the negative end of the differential amplifier 143. When the switch SW7 is opened and when the switch SW3 is closed, the capacitor CK1 discharges. When the switch SW8 is closed and when the switch SW4 is opened, the capacitor CK2 of the charge maintenance circuit 142 receives the other one of the selected touch signals from the sense capacitance circuit 112 and is charged. The charged voltage between the two ends of the capacitor CK2 becomes the input of the positive end of the differential amplifier 143. When the switch SW8 is opened and when the switch SW4 is closed, the capacitor CK2 discharges. Moreover, the charge maintenance circuits 141 and 142 operate synchronously, that is, the switches SW7 and SW8 operate synchronously; the switches SW3 and SW4 operate synchronously. When receiving the two selected signals simultaneously, the differential amplifier 143 generates the first differential signal D1.

As shown in FIG. 1, the detection module 15 includes an integrator 110, a voltage buffer 120, a sensing integrated unit 130, a differential amplifier 140, and a charge maintenance circuit 150. The integrator 110 connects to the sensing module 14 for receiving the differential signal D1 and generating an averaged sensing value. The voltage buffer 120 connects to the sensing module 14 and connects to the integrator 110 in parallel for receiving the differential signal D1 and generating a reference value. The use of the voltage buffer 120 is to balance with integrator 110 so that both the outputs of the integrator 110 and the voltage buffer 120 have similar order of charging load to release the input range of the differential amplifier 140. The sensing integrated unit 130 respectively connects to the integrator 110 in parallel through a switch W3 and to a negative end of the differential amplifier 140 in parallel through a switch W5. The switches W3 and W5 are connected in series. The charge maintenance circuit 150 connects to the voltage buffer 120 in parallel through a switch W4 and to a positive end of the differential amplifier 140 in parallel through a switch W6. The switches W4 and W6 are connected in series.

The sensing integrated unit 130 includes a switch W1 connecting to (N−1) charge maintenance circuits in parallel, and every charge maintenance circuit includes a capacitor (shown as CS1, CS2 or CS(N−1)) and switch (shown as K1, K2 or K(N−1)) and connects to each other in series. In every charge maintenance circuit, the switch connects to the capacitor in series, and the switch W1 connects to the capacitors of all charge maintenance circuits in parallel. The charge maintenance circuit 150 includes a switch W2 and a capacitor CD1, the switch W2 connects to the capacitor CD1 in parallel. In addition, the control or the selection of the charge maintenance circuits in sensing integrated unit 130 is based on the operation of the switch of every charge maintenance circuit, and the operation of the switches K1 to K(N−1) is described as below.

Figure 4:
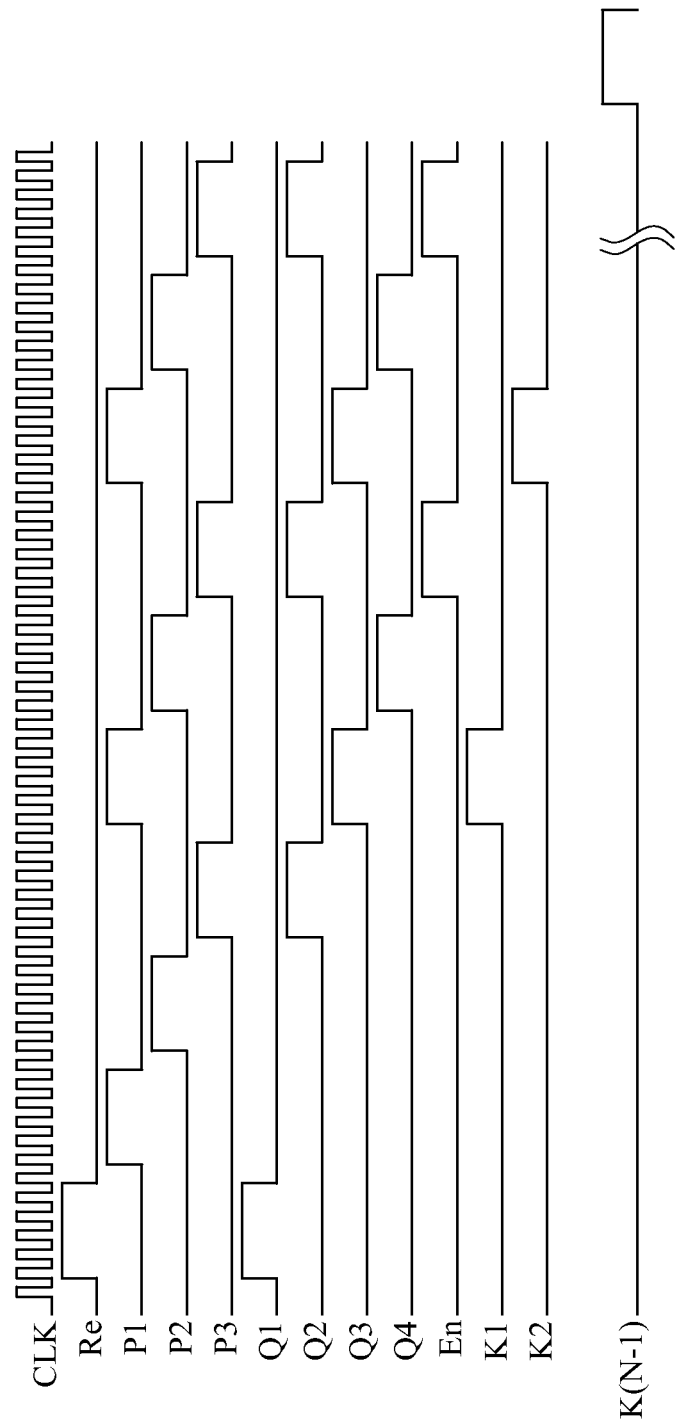
FIG. 4 is a timing chart diagram of the touch sensing system of the implementation of FIG. 1.

As shown in FIG. 1 and FIG. 4, the switches K1 to K(N−1) are controlled by the selection control signal SI(i), that is, the switch K1 operates according to the control of the selection control signal SI1 if the value of i is 1. In one embodiment, the value of i is 1, and when the switch W3 is closed and when the switch K1 is closed, the capacitor CS1 is charged by the averaged sensing value from the integrator 110. When the switch W5 is closed, the charged voltage formed between the two ends of the capacitor CS1 becomes the input of the negative end of the differential amplifier 140. When the switch W4 is closed, the capacitor CD1 can be charged by the reference value from the voltage buffer 120. When the switch W6 is closed, the charged voltage formed between the two ends of the capacitor CD1 becomes the input of the positive end of the differential amplifier 140. The differential amplifier 140 simultaneously receives the averaged sensing value and the reference value to generate a differential signal D2. When the switches W1 and W2 are closed and when the switches W3, W4, W5, and W6 are opened, the charged capacitor CS1 is discharged through the switch W1 and the charged capacitor CD1 discharges through the switch W2. The switches W1 and W2 respectively connect to the ground.

FIG. 3A illustrates a circuit structure diagram of an embodiment of a control module of the implementation of FIG. 1. The control module 16 includes a differential amplifier 161, an analog to digital converter (ADC) 162, and a timing controller 163. The differential amplifier 161 connects to the sensing device 12 of FIG. 1 for receiving the differential signal D2 and further generating a differential signal according to the differential signal D2 and a reference voltage Vref for tuning compensation. The reference voltage Vref is used to adjust the ADC 162 tuning range and compensate the offset so the higher resolution can be achieved by the ADC 162 while the differential result of the differential signal D2 will be concentrated on certain voltage range. It is usually happened when the sensing result is averaged by the integrator 110 of FIG. 1. The ADC 162 connects to the differential amplifier 161, receives the differential signal from the differential amplifier 161, and converts the differential signal to a digital signal. The timing controller 163 connects to the ADC 162, enables the ADC 162 through an enable signal En, and generates two groups of control signals based on a clock signal CLK and the digital signal, and the operation timing of the two groups of control signals are described as below.

The first group of control signals is referred as the control signals P1 to P3 and is used to control the operation of the sensing module 14 and the operation of the touch input interface 11 in FIG. 2. The second group of control signals is referred as the control signals Q1 to Q4 and is used to control the operation of the detection module 15 in FIG. 1.

As shown in FIG. 2, FIG. 3A, and FIG. 4, the control signal P1 of the first group of control signals controls the operation of the switches SW1, SW2, SW3, and SW4. When the status of the control signal P1 becomes a high logic level (ON), the switches SW1, SW2, SW3, and SW4 are closed. When the status of the control signal P1 becomes a low logic level (OFF), the switches SW1, SW2, SW3 and SW4 are opened. The control signal P2 of the first group of control signals controls the operation of the switches SW5 and SW6. When the status of the control signal P2 becomes ON, the switches SW5 and SW6 are closed. When the status of the control signal P2 becomes OFF, the switches SW5 and SW6 are opened. The control signal P3 of the first group of control signals control the operation of the switches SW7 and SW8. When the status of the control signal P3 becomes ON, the switches SW7 and SW8 are closed. When the status of the control signal P3 becomes OFF, the switches SW7 and SW8 are opened.

As shown in FIG. 1, FIG. 3A, and FIG. 4, the control signal Q1 of the second group of control signals controls the operation of the switch W1. When the status of the control signal Q1 becomes ON, the switch W1 is closed. When the status of the control signal Q1 becomes OFF, the switch W1 is opened. The control signal Q2 of the second group of control signals controls the operation of the switch W2. When the status of the control signal Q2 becomes ON, the switch W2 is closed. When the status of the control signal Q2 becomes OFF, the switch W2 is opened. The control signal Q3 of the second group of control signals controls the operation of the switches W3 and W4. When the status of the control signal Q3 becomes ON, the switches W3 and W4 are closed. When the status of the control signal Q3 becomes OFF, the switches W3 and W 4 are opened. When the status of the control signal Q4 becomes ON, the switches W5 and W6 are closed. When the status of the control signal Q4 becomes OFF, the switches W5 and W6 are opened.

Figure 5:
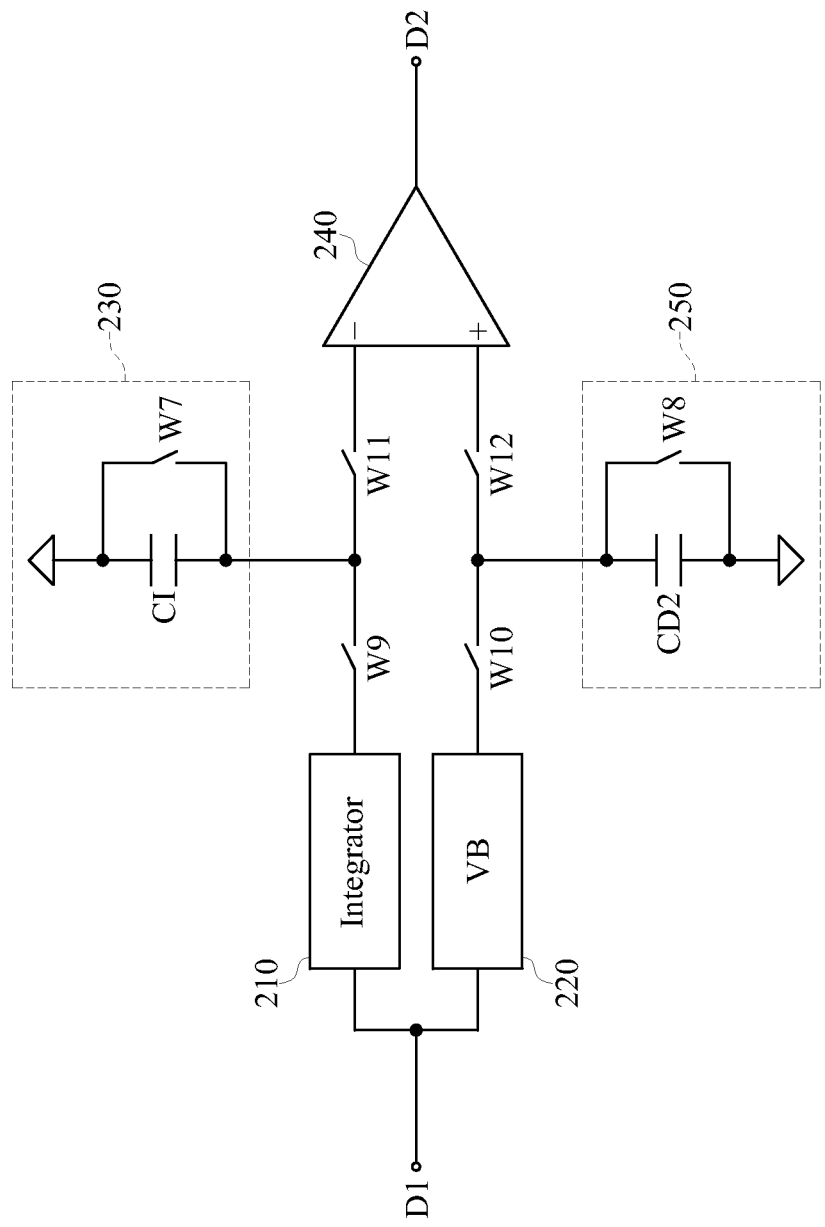
FIG. 5 is a circuit structure diagram of another embodiment of a detection module of the implementation of FIG. 1.

FIG. 5 illustrates a circuit structure diagram of another embodiment of a detection module of the implementation of FIG. 1. The detection module 25 includes an integrator 210, a voltage buffer 220, a sensing integrated unit 230, a differential amplifier 240, and a charge maintenance circuit 250. The integrator 210 connects to the sensing module 14 of FIG. 1 for receiving the differential signal D1 and generating an averaged sensing value. The voltage buffer 220 connects to the sensing module 14 of FIG. 1 and connects to the integrator 210 in parallel for receiving the differential signal D1 and generating a reference value. The use of the voltage buffer 220 is to balance with integrator 210 so that both the outputs of the integrator 210 and the voltage buffer 220 have similar order of charging load to release the input range of the differential amplifier 240.

The sensing integrated unit 230 connects to the integrator 210 in parallel through a switch W9 and connects to a negative end of the differential amplifier 240 in parallel through a switch W11. The switches W9 and W11 are connected in series. The charge maintenance circuit 250 connects to the voltage buffer 220 in parallel through a switch W10 and connects to a positive end of the differential amplifier 240 in parallel through a switch W12. The switches W10 and W12 are connected in series. The sensing integrated unit 230 includes a switch W7 and a capacitor CI (a charge maintenance circuit) and the switch W7 connects to the capacitor CI in parallel. The charge maintenance circuit 250 includes a switch W8 and a capacitor CD2, and the switch W8 connects to the capacitor CD2 in parallel.

When the switch W9 is closed, the capacitor CI is charged by the averaged sensing value from the integrator 210. When the switch W11 is closed, the charged voltage formed between the two ends of the capacitor CI becomes the input of the negative end of the differential amplifier 240. When the switch W10 is closed, the capacitor CD2 is charged by the reference value from the voltage buffer 220. When the switch W12 is closed, the charged voltage formed between the two ends of the capacitor CD2 becomes the input of the positive end of the differential amplifier 240. The differential amplifier 240 simultaneously receives the averaged sensing value and the reference value to generate a differential signal D2. When the switches W7 and W8 are closed and when the switches W9, W10, W11, and W12 are opened, the charged capacitor CI discharges through the switch W7, and the charged capacitor CD2 discharges through the switch W8 which connects to the ground. In addition, the operation of the switches W7 and W8 is based on the reset signal Re which is provided by the control module 16 of FIG. 1 and will be described as below.

FIG. 3B illustrates a circuit structure diagram of another embodiment of a control module of the implementation of FIG. 1. The control module 26 includes a differential amplifier 261, an ADC 262, and a timing controller 263. The differential amplifier 261 connects to the sensing device 12 of FIG. 1 for receiving the differential signal D2 and further generating a differential signal according to the differential signal D2 and a reference voltage Vref for tuning compensation. The reference voltage Vref is used to adjust the ADC 162 tuning range and compensate the offset so the higher resolution can be achieved by the ADC 162 while the differential result of the differential signal D2 will be concentrated on certain voltage range. It is usually happened when the sensing result is averaged by the integrator 210 of FIG. 5. The ADC 262 connects to the differential amplifier 261, receives the differential signal from the differential amplifier 261, and coverts the differential signal to a digital signal. The timing controller 263 connects to the ADC 262, enables the ADC 262 through an enable signal En, and generates two groups of control signals based on a clock signal CLK. The operation timing of the two groups of control signals are described as below.

The first group of control signals is referred as the control signals P4 to P6 and is used to control the operation of the sensing module 14 and of the touch input interface 11 in FIG. 2. The second group of control signals is referred as the control signals Q5 to Q7 and is used to control the operation of the detection module 25 in FIG. 5.

As shown in FIG. 2, FIG. 3B, FIG. 5, and FIG. 6, the control signal P4 of the first group of control signals controls the operation of the switches SW1, SW2, SW3, and SW4. When the status of the control signal P4 becomes ON, the switches SW1, SW2, SW3, and SW4 are closed. When the status of the control signal P4 becomes OFF, the switches SW1, SW2, SW3, and SW4 are opened. The control signal P5 of the first group of control signals controls the operation of the switches SW5 and SW6. When the status of the control signal P5 becomes ON, the switches SW5 and SW6 are closed. When the status of the control signal P2 becomes OFF, the switches SW5 and SW6 are opened. The control signal P6 of the first group of control signals control the operation of the switches SW7 and SW8. When the status of the control signal P6 becomes ON, the switches SW7 and SW8 are closed. When the status of the control signal P6 becomes OFF, the switches SW7 and SW8 are opened.

Figure 6:
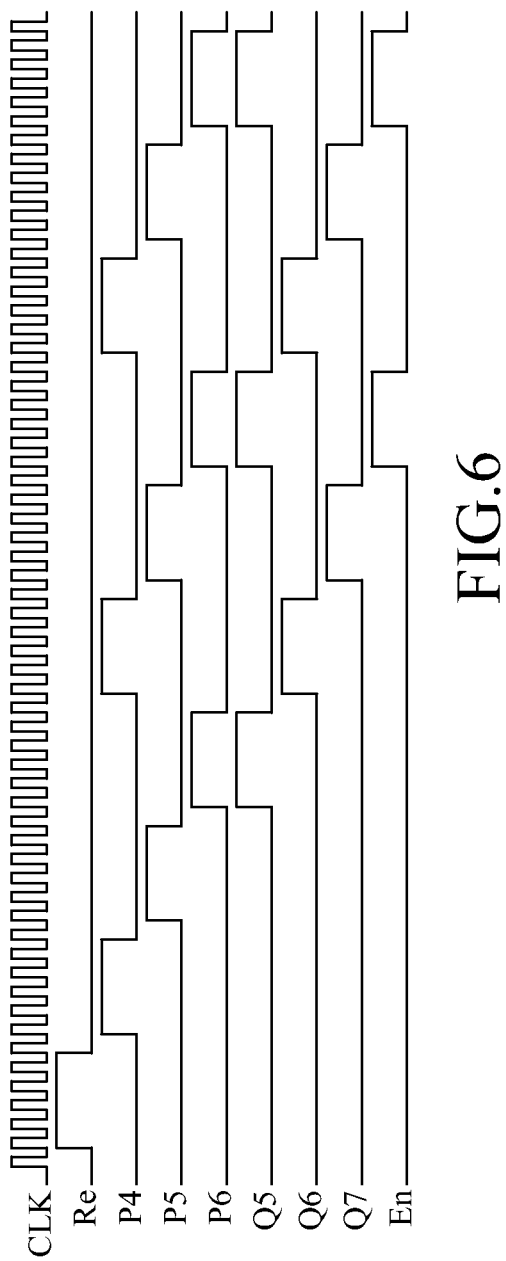
FIG. 6 is a timing chart diagram of the touch sensing system of the implementation of FIG. 5.

As shown in FIG. 3B, FIG. 5, and FIG. 6, the control signal Q5 of the second group of control signals controls the operation of the switch W8. When the status of the control signal Q5 becomes ON, the switch W8 is closed. When the status of the control signal Q5 becomes OFF, the switch W8 is opened. The control signal Q6 of the second group of control signals controls the operation of the switches W9 and W10. When the status of the control signal Q6 becomes ON, the switches W9 and W10 are closed. When the status of the control signal Q6 becomes OFF, the switch W9 and W10 are opened. The control signal Q7 of the second group of control signals controls the operation of the switches W11 and W12. When the status of the control signal Q7 becomes ON, the switches W11 and W12 are closed. When the status of the control signal Q7 becomes OFF, the switches W11 and W12 are opened. Moreover, the reset signal Re controls the operation of the switch W7. When the status of the reset signal Re becomes ON in the beginning of an operation cycle of the touch sensing system 10, the switch W7 is closed. When the status of the reset signal Re becomes OFF, the switch W7 is opened.

Accordingly, through the operation process described as above, the touch sensing system can achieve the purpose of sensing the touch from a user and of determining the position concerning to the touch.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensing device for determining N touch signals, wherein N is a positive integer, and the sensing device comprising:
    a selector for selecting an ith touch signal and an (i+1)th touch signal from the touch signals according to at least one selection control signal, i is a positive integer from 1 to (N−1);
    a sensing module connecting to the selector in series and comprising:
        a first differential amplifier for comparing the selected touch signals and producing a first differential signal according to a plurality of first control signals;
        a first sensing line comprising a first switch and a first charge maintenance circuit for receiving the ith touch signal and transmitting the ith touch signal to a first end of the first differential amplifier, wherein the first charge maintenance circuit connects to the first switch in series and receives the ith touch signal when the first switch is closed according to the control of a first part of the first control signals; and
        a second sensing line comprising a second switch and a second charge maintenance circuit for receiving the (i+1)th touch signal and transmitting the (i+1)th touch signal to a second end of the first differential amplifier, wherein the second charge maintenance circuit connects to the second switch in series and receives the (i+1)th touch signal when the second switch is closed according to the control of the first part of the first control signals; and
    a detection module connecting to the sensing module in series for according to a plurality of second control signals, generating an averaged sensing value and a reference value from the first differential signal and comparing the averaged sensing value with the reference value to produce a second differential signal.

2. The sensing device according to claim 1, wherein the selector is a multiplexer.

3. The sensing device according to claim 1, wherein each of the first charge maintenance circuit and the second charge maintenance circuit comprises a capacitor and a third switch which connects to the capacitor in parallel, the third switches synchronously operate according to the control of a second part of the first control signals.

4. The sensing device according to claim 1, wherein the detection module comprises:
    an integrator for integrating the first differential signal to generate the averaged sensing value;
    a voltage buffer for receiving the first differential signal to generate the reference value; and
    a second differential amplifier for simultaneously receiving the averaged sensing value and the reference value to generate the second differential signal, wherein the integrator and the voltage buffer synchronously operate.

5. The sensing device according to claim 4, wherein the detection module further comprises:
    a sensing integrated unit respectively connecting to the integrator in parallel through a first switch and connecting to the second differential amplifier in parallel through a second switch, wherein the first switch connects to the second switch in series, and the sensing integrated unit comprising:
        at least one first charge maintenance circuit for maintaining the averaged sensing value and transmitting the averaged sensing value to a first end of the second differential amplifier, wherein the at least one first charge maintenance circuit receives the averaged sensing value from the integrator when the first switch is closed according to the control of a first part of the second control signals, and the at least one first charge maintenance circuit transmits the averaged sensing value to the second differential amplifier when the second switch is closed according to the control of a second part of the second control signals; and
        a third switch connecting to the at least one first charge maintenance circuit in parallel for controlling the operation of the at least one first charge maintenance circuit; and
    a second charge maintenance circuit respectively connecting to the voltage buffer in parallel through a fourth switch and to the second differential amplifier in parallel through a fifth switch, and comprising:
        a first capacitor for maintaining the reference value and transmitting the reference value to a second end of the second differential amplifier, wherein the first capacitor receives the reference value from the voltage buffer when the fourth switch is closed according to the control of the first part of the second control signals, and the first capacitor transmits the reference value to the second differential amplifier when the fifth switch is closed according to the control of the second part of the second control signals; and
        a sixth switch connecting to the first capacitor in parallel for controlling the operation of the first capacitor according to the control of a third part of the second control signals.

6. The sensing device according to claim 5, wherein the at least one first charge maintenance circuit comprises:
    a second capacitor connecting to the third switch in parallel for maintaining the averaged sensing value and transmitting the averaged sensing value to the second differential amplifier; and a seventh switch connecting to the second capacitor in series for controlling the operation of the second capacitor.

7. The sensing device according to claim 6, wherein the third switch is controlled by a fourth part of the second control signals, and the seventh switch is controlled by the selection control signal.

8. The sensing device according to claim 5, wherein the first charge maintenance circuit comprises a second capacitor, the third switch is controlled by a reset signal, wherein the reset signal is used to reset the sensing device.

9. A touch sensing system, comprising:
a touch input interface comprising N signal generation circuits for providing N touch signals to the selector, wherein N is a positive integer;
a sensing device connecting to the touch input interface in series and comprising:
a selector for selecting an ith touch signal and an (i+1)th touch signal from the touch signals according to at least one selection control signal, i is a positive integer from 1 to (N−1);
a sensing module connecting to the selector in series and comprising a first differential amplifier to compare the selected touch signals and produce a first differential signal according to a plurality of first control signals; and
a detection module connecting to the sensing module in series for according to a plurality of second control signals, generating an averaged sensing value and a reference value from the first differential signal and comparing the averaged sensing value and the reference value to produce a second differential signal; and
a control module connecting to the detection module in series for according to the second differential signal, generating the first control signals and the second control signals;
wherein an ith signal generation circuit of the N signal generation circuits and an (i+1)th sense capacitance circuit of N sense capacitance circuits are selected by the selector and operate synchronously according to a first part and a second part of the first control signals, an ith sense capacitance circuit providing the ith touch signal is adjacent to the (i+1)th sense capacitance circuit providing the (i+1)th touch signal;
wherein the ith sense capacitance circuit and the (i+1)th sense capacitance circuit respectively comprising:
a capacitor; and
a first switch connecting to the capacitor in parallel for controlling the operation of the capacitor;
wherein the ith sense capacitance circuit connects to the (i+1)th sense capacitance circuit in parallel through two second switches which connect to each other in series, the second switches operate synchronously and are controlled by the first part of the first control signals, and the first switches are controlled by the second part of the first control signals.

10. The touch sensing system according to claim 9, wherein the selector is a multiplexer.

11. The touch sensing system according to claim 9, wherein the sensing module further comprises:
a differential amplifier for receiving the ith touch signal and the (i+1)th touch signal to generate the first differential signal;
a first sensing line connecting to a first end of the differential amplifier and comprising a first charge maintenance circuit which connects to the ith sense capacitance circuit through a third switch for receiving the ith touch signal from the ith sense capacitance circuit and transmitting the ith touch signal to the first differential amplifier, wherein the first charge maintenance circuit receives the ith touch signal when the first switch is closed according to the control of a third part of the first control signals; and
a second sensing line connecting to a second end of the differential amplifier and comprising a fourth switch and a second charge maintenance circuit for receiving the (i+1)th touch signal from the (i+1)th sense capacitance circuit and transmitting the (i+1)th touch signal to the differential amplifier, wherein the second charge maintenance circuit receives the (i+1)th touch signal when the fourth switch is closed according to the control of the third part of the first control signals.

12. The touch sensing system according to claim 11, wherein the first charge maintenance circuit and the second charge maintenance circuit respectively comprises a capacitor and a fifth switch which connects to the capacitor in parallel, the fifth switches synchronously operate according to the control of the second part of the first control signals.

13. The touch sensing system according to claim 9, wherein the control module comprising:
a differential amplifier for compensating the second differential signal to generate a third differential signal through a reference voltage;
an analog to digital converter for converting the third differential signal to a digital signal; and
a timing controller for generating the first control signals and the second control signals according to the digital signal and a clock signal.

14. The touch sensing system according to claim 9, wherein the detection module comprising:
an integrator connecting to the sensing module for integrating the first differential signal to generate the averaged sensing value;
a voltage buffer connecting to the integrator in parallel for amplifying the first differential signal to generate the reference value which has a similar order as the averaged sensing value; and
a differential amplifier for simultaneously receiving the averaged sensing value and the reference value to generate the second differential signal, wherein the integrator and the voltage buffer synchronously operate.

15. The touch sensing system according to claim 14, wherein the detection module further comprising:
a sensing integrated unit respectively connecting to the integrator in parallel through a first switch and with the differential amplifier in parallel through a second switch, wherein the sensing integrated unit receives the averaged sensing value when the first switch is closed according to a first part of the second control signals, the sensing integrated unit transmits the averaged sensing value to the differential amplifier when the second switch is closed according to the control of a second part of the second control signals, and the sensing integrated unit comprising:
at least one first charge maintenance circuit for maintaining the averaged sensing value and transmitting the averaged sensing value to a first end of the differential amplifier; and
a third switch connecting to the at least one first charge maintenance circuit in parallel for controlling the operation of the at least one first charge maintenance circuit; and
a second charge maintenance circuit respectively connecting to the voltage buffet in parallel through a fourth switch and to the differential amplifier in parallel through a fifth switch, and comprising:

a first capacitor for maintaining the reference value and transmitting the reference value to a second end of the differential amplifier, wherein the first capacitor receives the reference value when the fourth switch is closed according to the control of the first part of the second control signals, and the first capacitor transmits the reference value to the second end of the differential amplifier when the fifth switch is closed according to the control of the second part of the second control signals; and a sixth switch connecting to the first capacitor in parallel for controlling the operation of the first capacitor according to the control of a third part of the second control signals.

16. The touch sensing system according to claim 15, wherein the at least one first charge maintenance circuit comprising:

a second capacitor connecting to the third switch in parallel for maintaining the averaged sensing value and transmitting the averaged sensing value to the first end of the differential amplifier; and a seventh switch connecting to the second capacitor in series for controlling the operation of the second capacitor.

17. The touch sensing system according to claim 16, wherein the third switch is controlled by a fourth part of the second control signals, and the seventh switch is controlled by the selection control signal.

18. The touch sensing system according to claim 15, wherein the first charge maintenance circuit comprises a second capacitor, the third switch is controlled by a reset signal provided by the touch sensing system, wherein the reset signal is used to reset the touch sensing system.

19. A display device comprises the touch sensing system as claimed in claim 9.

* * * * *